(12) United States Patent
Ahluwalia et al.

(10) Patent No.: US 7,988,925 B2
(45) Date of Patent: Aug. 2, 2011

(54) FUEL PROCESSING DEVICE

(75) Inventors: Rajesh K. Ahluwalia, Burr Ridge, IL (US); Shabbir Ahmed, Naperville, IL (US); Sheldon H. D. Lee, Willowbrook, IL (US)

(73) Assignee: UChicago Argonne, LLC, Chicago, IL (US)

( * ) Notice: Subject to any disclaimer, the term of this patent is extended or adjusted under 35 U.S.C. 154(b) by 116 days.

(21) Appl. No.: 12/006,468

(22) Filed: Jan. 3, 2008

(65) Prior Publication Data

US 2009/0087358 A1    Apr. 2, 2009

Related U.S. Application Data

(62) Division of application No. 10/780,348, filed on Feb. 17, 2004, now Pat. No. 7,323,159.

(60) Provisional application No. 60/447,483, filed on Feb. 14, 2003.

(51) Int. Cl.
*B01J 19/26* (2006.01)

(52) U.S. Cl. .................................................. 422/198

(58) Field of Classification Search .............. 48/62 R; 422/198

See application file for complete search history.

(56) References Cited

U.S. PATENT DOCUMENTS

| 1,730,115 | A | * | 10/1929 | Bristol | 123/179.14 |
| 2,892,693 | A | * | 6/1959 | Eastman | 48/198.3 |
| 2,993,480 | A | * | 7/1961 | Huet | 122/34 |
| 4,318,384 | A | * | 3/1982 | Moffett | 123/557 |
| 6,617,067 | B1 | * | 9/2003 | Tachihara et al. | 429/20 |
| 2002/0172630 | A1 | * | 11/2002 | Ahmed et al. | 422/190 |

* cited by examiner

*Primary Examiner* — Glenn Caldarola
*Assistant Examiner* — Randy Boyer
(74) *Attorney, Agent, or Firm* — Cherskov & Flaynik

(57) ABSTRACT

An improved fuel processor for fuel cells is provided whereby the startup time of the processor is less than sixty seconds and can be as low as 30 seconds, if not less. A rapid startup time is achieved by either igniting or allowing a small mixture of air and fuel to react over and warm up the catalyst of an autothermal reformer (ATR). The ATR then produces combustible gases to be subsequently oxidized on and simultaneously warm up water-gas shift zone catalysts. After normal operating temperature has been achieved, the proportion of air included with the fuel is greatly diminished.

4 Claims, 12 Drawing Sheets

FUEL PROCESSING DEVICE

This divisional patent application claims the benefit of U.S. utility application Ser. No. 10/780,348 filed on Feb. 17, 2004 issued as U.S. Pat. No. 7,323,159 which in turn claimed the priority benefit of U.S. Provisional Patent Application No. 60/447,483, filed on Feb. 14, 2003.

CONTRACTUAL ORIGIN OF THE INVENTION

The United States Government has rights in this invention pursuant to contract number W-31-109-ENG-38 between the U.S. Department of Energy and the University of Chicago representing Argonne National Laboratory.

BACKGROUND OF THE INVENTION

1. Field of the Invention

This invention relates to a device for rapidly heating up a fuel to its operating temperatures and more particularly, this invention relates to rapidly heating up a fuel processor so that it is able to deliver hydrogen ($H_2$) to a fuel cell stack within as little as 30 seconds.

2. Background of the Invention

Fuel cells operate using hydrogen ($H_2$) as an energy source to generate electrical power. Many of these fuel cell systems have duty cycles that require frequent starts and stops.

The earliest introduced fuel-cell-powered vehicles will find wide consumer acceptance if they can operate on widely available conventional fuels. As such, these revolutionary vehicles will need to include mini-refineries (known as fuel processors) to convert fuels such as gasoline, methanol, and other fuels to a hydrogen-rich reformate gas. Besides meeting stringent fuel cell operating parameters on the amount of carbon monoxide and sulfur that can be present in the reformate, these fuel processors should be energy-efficient, lightweight and compact enough to fit under the hood of a vehicle without compromising performance. Commercial success of these fuel cell systems will be contingent upon their ability to start-up within a very short time.

Typical fuel processors include several unit operations and processes, most of which are conducted at elevated (greater than 60° C.) temperatures. These processors define catalytic zones and heat exchangers that represent significant thermal mass. Raising these masses to their respective operating temperatures requires transferring thermal energy rapidly, but at a controlled rate so as to prevent damage of the material being heated.

Raising the temperature of a given mass in the processor requires heat. By reducing the thermal mass of the fuel processor (i. e., by not bringing all units of the processor to normal operational temperature during startup), the amount of fuel and time needed to generate this heat is reduced. The amount of fuel a processor requires to reach its operating temperature is the "fuel penalty." "Fuel penalties" can become a significant portion of the total fuel used in power systems having short cycles. The more cycles in a particular amount of time, the more fuel used in that amount of time for start-up as a result of the "fuel penalty." If the second cycle or trip occurs before the system cools down, the penalty is lower.

In many applications such as transportation, it is important to maintain a very short startup-time. Since today's automobiles are powered by internal combustion engines, today's drivers are accustomed to start-and-drive performance. If fuel cell power is to replace internal combustion power, start-up performance will be critical for commercial success It is anticipated that fuel cell vehicles will be hybridized with battery power that can provide propulsion power to the vehicle at startup while the fuel cell system warms up to become operational. The weight of batteries, and its resulting penalty on the car's fuel economy, means that the need for battery power should be limited to a very short duration. This implies that the battery should provide only minimal start-up support, and that the fuel processor itself must have fast-start capability.

A mass can be heated to its operating temperature by burning fuel. A given thermal mass, $mC_p\Delta T$, (wherein m=mass, $C_p$=heat capacity, $\Delta T$=temperature rise) can be heated to its operating temperature faster by increasing the rate of fuel combustion. However, the maximum rate at which this can be sustained depends on many factors such as the capacity of the fuel pump, the air blower/capacity, temperature control to prevent local overheating, and pressure drops through the components and flow passages.

U.S. Pat. No. 6,210,821 awarded to Lesieur, et al. on Apr. 3, 2001 discloses a method and apparatus for a fuel gas processing system. A rapid start-up method is not provided and the start-up is not run or initiated using conventional hydrocarbon-based fuels.

A need exists in the art for a quick start-up time for fuel processors for fuel cell power systems and a method by which a fuel processor can be started so it attains its operating temperature within a very short time. The method should require only a small equipment footprint so as to fit under the hood of a vehicle. The method should draw minimal amounts of electrical power and fuel. Finally, the method should be relatively inexpensive.

SUMMARY OF THE INVENTION

It is an object of the present invention to provide a method for minimizing start-up times for fuel cell power systems, especially the fuel processor, that overcomes many of the disadvantages of the prior art.

Another object of the present invention is to provide a method for rapid startup (i.e., within 30 seconds) of a fuel processor within a fuel cell power system. A feature of the invention is that a small amount of fuel is ignited to initiate a rapid warmup process. An advantage of the invention is that the rapid warmup process reduces the amount of fuel used during the warmup and thus lowers costs.

Still another object of the present invention is to provide a method for rapid startup of a fuel processor that requires little electrical power. A feature of the invention is that the minor electrical assist allows the size, and therefore the weight, of the electrical source (i.e. a battery or capacitor) to be minimized. An advantage of the invention is lower electrical source weights results in lower vehicle weights and therefore better fuel economy.

Yet another object of the present invention is to provide a method that uses little fuel for the start-up of fuel processor and fuel cell systems. A feature of the invention is that the method segregates some of the reaction zones within a fuel processor during start-up. An advantage of this is that the method is more economical than those systems which simultaneously heat the entire equipment bulk of the fuel processor.

Briefly, the invention provides a process for rapidly heating a fuel processor to its operating temperature, the process comprising reforming fuel with a catalyst to produce steam, carbon monoxide, and hydrogen gas; homogeneously mixing air with the carbon monoxide and hydrogen gas to create a mixture which will react and produce heat; using the heat to raise the temperature of catalysts in the fuel processor; combining the mixture with an oxidant to decrease the concentration of carbon monoxide; using the heat to produce steam; and mixing the steam with the mixture to increase the yield of hydrogen gas. The invention also provides a method for converting hydrocarbon fuels to a reformate gas, the method comprising producing combustible moieties from the fuels; oxidizing the combustible moieties to generate heat; utilizing the heat to increase the surface temperatures of catalysts; and contacting the reactants to the catalysts.

In addition, the invention provides a device for the vaporization of fuel, the device comprising a means to provide the latent heat of vaporization of the fuel; and a means to provide superheating of the fuel.

BRIEF DESCRIPTION OF THE DRAWINGS

The invention together with the above and other objects and advantages will be best understood from the following detailed description of the preferred embodiment of the invention shown in the accompanying drawing, wherein.

DETAILED DESCRIPTION OF THE INVENTION

Figure 1:
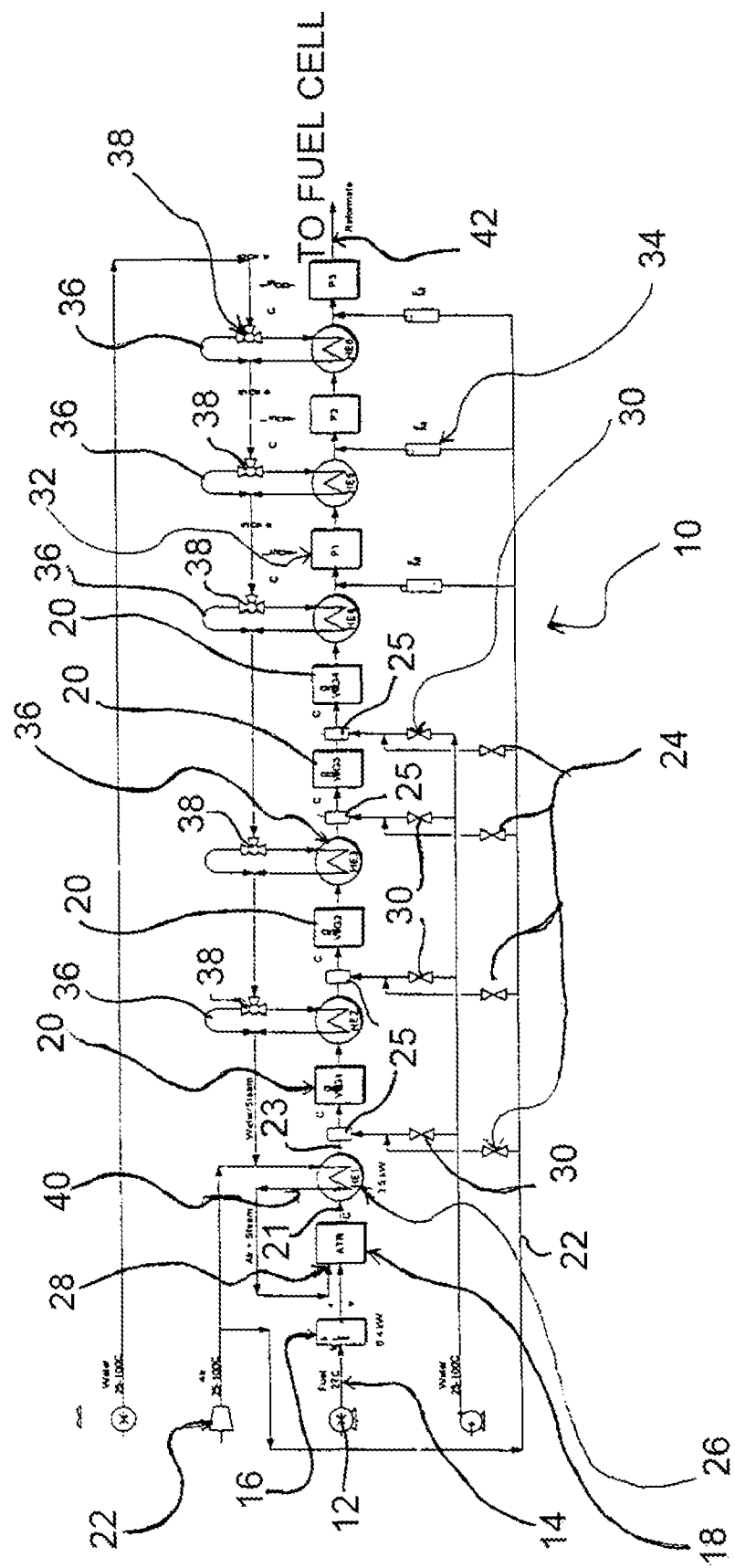
FIG. 1 is a schematic diagram of salient features of the invented method, in accordance with features of the present invention.

The inventors have found that quick starting of a fuel processor can be achieved by exothermic reforming of fuel via catalytic partial oxidation (CPOX). This reforming is achieved by injecting fuel and oxidants into an autothermal reformer with subsequent injections of oxidant (e. g., air) to reheat the reformate gas (water-gas) as it passes through each of several water-gas shift catalyst portions of the fuel processor. The fuel processor is brought up to its operating temperature in less than 60 seconds, and often less than 30 seconds.

The invented system comprises a partial oxidation or reforming reaction zone, a plurality of water-gas shift reactor zones, and a plurality of preferential oxidation reaction zones. The invention embodies a sequence of fast heating zones whereby heat is generated by the rapid oxidation of the hydrogen emanating from a reforming unit. The reforming unit is first started by an ignition source. Similar sources can be utilized to preheat fuel-air mixtures fed to the partial oxidation units positioned downstream from the reformer. Typically, the front edge of a reforming catalyst is heated to a temperature (e. g., for gasoline, 300° C.) where a fuel-air mixture ignites and generates heat to initiate the partial oxidation reactions of the fuel according to Equation 1.

   Equation 1

In the presence of steam, the feed fuels undergo the following reforming reactions, according to Equations 2 and 3, as the feed fuels pass through the self-heating fuel reformer (ATR).

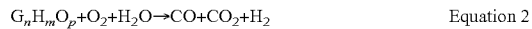   Equation 2

In Equations 1 and 2, $C_nH_mO_p$ represents fuel candidates such as gasoline, methane, methanol, ethanol, liquified propane gas (LPG), diesel, other hydrocarbon and alcohol fuels, and generally carbon fractions having fewer than sixteen carbons. As such, n, m, and p are natural numbers (0, 1, 2, 3, 4, etc.). For example, p can be zero, leaving the reactant as $C_nH_m$, which is then a hydrocarbon.

The reformate gas then passes through a sulfur trap, if needed, to reduce the sulfur level This is followed by a water-gas shift reactor where the majority of the carbon monoxide (CO) is reacted with steam to produce carbon dioxide ($CO_2$) and additional $H_2$ according to Equation 3.

   Equation 3

Overall, the processes embodied in Equations 2 and 3 cause the hydrogen concentrations in the reformate gas to increase as the fuel stream advances through the fuel processor.

The reformate gas leaving the water-gas shift unit contains ~1% volume (v) CO, which is further processed in a preferential oxidation unit via the reaction given by Equation 4:

   Equation 4

This reaction reduces the CO level to 10 to 50 ppm volume (v). Further, the total amount of air injected downstream of the reformer is completely oxidized before exiting the fuel processor.

A salient feature of the instant invention is that, during the start-up process, air (at ambient temperature) is mixed with reformate gas just before the reformate gas enters the water-gas shift catalyst (WGS) zones. The injected air serves to oxidize some hydrogen and CO, and generate heat needed to activate the WGS reactors. The heat from the reaction given in Equation 3 further activates water-gas shift catalysts contained within the reactor, thereby facilitating additional carbon monoxide conversion and heat production. This feature avoids having to rapidly heat the entire system all at once, and thus saves on energy costs.

The water-gas shift reactor catalyst can operate in a temperature range from about 25° C. to 500° C. Liquid water Is Injected when the water-gas shift catalyst temperature exceeds 400° C.

The amount of air injected at each of the critical zones is adjusted to maintain the following priority in heating the catalyst beds: the ATR, water-gas catalyst 1 ($WG_1$), $WG_2$, $WG_3$, preferential oxidation zone ($P_1$, $P_2$, $P_3$), and $WG_4$.

FIG. 1 depicts a fuel processor system, designated as numeral 10. The fuel processor 10 consists of a fuel pressurizer 12 that charges an initial point of ingress 14 for the fuel. The pressure of fuel entering the fuel cell is usually lower than the pressure of fuel at the initial point of fuel ingress 14. For example, if the fuel cell pressure is 0.50 atmosphere (atm), the inlet gas pressure is approximately 0.55 atm. In the case where liquid fuel is injected into the processor, the pressure difference can be 100 psi.

Figure 5:
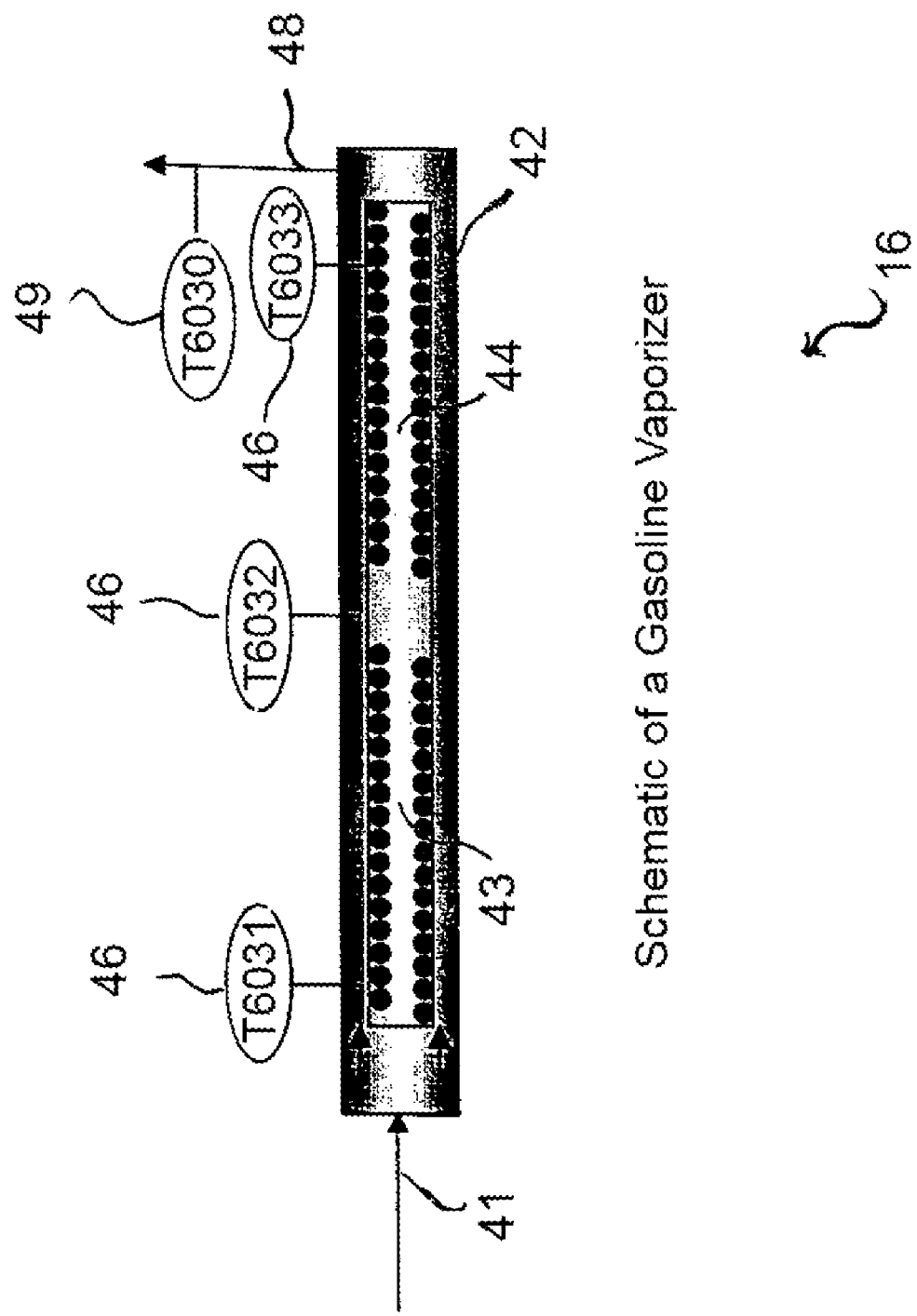
FIG. 5 is a schematic diagram of a gasoline vaporizer.

A fuel vaporizer, 16, positioned downstream from the pressurizer 12, feeds the gas to a reformer (ATR) 18 (FIG. 5 infra). The reformer 18 reacts the pressurized fuel with air (and sometimes water) to produce water-gas ($CO+CO_2+H_2$ and $H_2O$). Several water-gas reaction zones 20, situated downstream from the reformer 18 and designated as $WG_1$, $WG_2$, $WG_3$, and $WG_4$, facilitate the water-gas shift reaction depicted in Equation 2.

Air 22 at ambient temperature enters the fuel processor 10 at various points in the process. The air is injected in a controlled fashion, via a series of valves 24.

Preferably, the air is heated by an initial heat exchanger 26 (such as a steam superheater, the initial heat exchanger designated as $HE_1$).

Heat exchangers 36 (designated as $HE_2$, $HE_3$, etc.) are placed at various locations to ensure appropriate temperatures of the process gas entering the water-gas chambers and also the reaction chambers. The heat exchangers 36 are positioned upstream of each water gas zone 20. For example, the now-heated air emanating from the initial heat exchanger enters the reformer via an adjustable means of ingress 28 such as a stopcock, valve or some other fluid control device. Mixing zones 25 are present between the water-gas reaction zones (e. g., $WG_2$ 20) and the heat exchangers (e. g., $HE_2$ 36), and provide a means to homogeneously mix air with the reformate gas entering generated in the water-gas reaction zone.

Typically, water is used as the cooling media. Water at a temperature from about 25° C. to 100° C. enters the processor through all heat exchangers 36 via a series of valves 38. Additional water can be injected into the processor upstream of the water-gas reaction zones, via a series of valves 30. After egress 40 from the initial heat exchanger, 26 the water/steam, along with the aforementioned air, enters the reformer.

Downstream from the water-gas reaction zones are a plurality of reaction zones 32 (designated $P_1$, $P_2$, and $P_3$) for the preferential oxidizing of carbon monoxide according to the oxidation process as depicted in Equation 4. Air is injected upstream of the catalysts into the preferential oxidation catalyst zones to have ensure that the CO levels are within the specified range (during normal operation). Afternatively, the preferential oxidation zones are heated to their specified operating temperatures (during startup). Flow meters 34, such as standard mass flow controllers, are used to control the flow of air into the redox reaction zones 32.

Reformate gases exit the processor after treatment in the preferential oxidation zone $P_3$ via a reformate gas means of egress 42.

Temperature Regulation

Detail

Temperatures achieved by the vaporizer 16 can reach the final boiling point (i.e., the endpoint) of the fuel. Typically, the hottest surface within the vaporizer has a temperature from about 50° C. to 100° C. above the end point. The vaporizer is heated by electrical power or fuel combustion. Further, the vaporizer has dual heating elements with feedback control. A first heating element supplies the latent heat of vaporization for the fuel, and simultaneously, a second heating element provides any small amount of superheating, if necessary. Fuel flow within the vaporizer follows a helical path as determined by internal fins. The vaporizer has a high heat transfer coefficient and a low thermal mass to minimize extra energy consumption for heating the vaporizer itself. Finally, the vaporizer is designed to have a high heat transfer coefficient to effect rapid and efficient vaporization of the fuel.

A myriad of sources can be utilized to supply heat to the vaporizer, including but not limited to, fuel combustion and electrical resistance heating. For electrical resistance heating, the vaporizer has two heating elements as mentioned supra.

In a preferred embodiment for fast start, all the combustible gases in the first few water-gas reaction zones (e.g., $WG_1$, $WG_2$, and $WG_3$) are oxidized. During this time, (i. e., simultaneously) no oxidation occurs in the reaction zones 32 ($P_1$, $P_2$, $P_3$,) and in the last or remaining water-gas reaction chambers (e.g., $WG_4$ seen in FIG. 1). This happens during the initial "warm-up period" (defined as the time during which the reformate gas will not flow into the fuel cell), and without overheating the catalysts in $WG_1$, $WG_2$, and $WG_3$.

If oxidation in the preferential oxidation zones 32 and $WG_4$ is needed, air can be injected prior (i. e., upstream) to these components. If the reformate gas exiting from a downstream preferential oxidation zone (e. g. $P_3$) contains combustible gas, that gas is subsequently completely oxidized in an anode burner (not shown). The heat energy is then used to preheat fuel processing air (for use in the reformer, and in downstream air injection points), or to generate fuel processing steam.

In the instant invention, $WG_3$ and $WG_4$ do not have a heat exchanger between them. This absence of a heat exchanger aids in minimizing the thermal mass of the processor. Instead, water, regulated via a valve 34, is used to cool gases going from $WG_3$ and $WG_4$.

Process water that flows into the reformer can bypass all heat exchangers (HE) except the first steam superheater ($HE_1$). (However, when $HE_1$ is cold or below an empirically determined temperature (e.g. 110° C.), the process water also bypasses $HE_1$.)

The maximum amount of air injected at each point in the processor is predetermined so the oxidation reactions at each of these locations proceed at a favorable rate. The reactions are fast enough that all the oxygen is consumed before the next air injection point, and slow enough that the oxidation reaction over a particular catalyst does not generate so much heat so as to overheat catalysts further downstream. The air-to-fuel and steam-to-fuel ratios are adjusted to rapidly achieve reforming temperatures from between about 600° C. to 850° C. in the reforming catalyst.

The instant invention produces fuel cell quality reformate gas that contains more than 30% hydrogen, less than 50 ppm (v) carbon monoxide, and less than 1 ppm (v) sulfur. (The reformate gas immediately out of the reformer is from about 25 percent to 35 percent hydrogen gas.)

Protocol

The startup process begins with the entry of fuel into the autothermal reformer 28 via a means to mix the fuel with air in a predetermined proportion. The mixing means is a multifunction nozzle which accommodates various phases and temperatures of fuel, air and water Briefly, the fuel injection process proceeds as follows:

1. Droplets of liquid fuel are mixed with air to create a liquid-fuel and oxidant mixture. This mixture is subjected to a catalyst situated in the reformer.

2. Once the vaporizer attains an empirically determined temperature, the liquid-fuel stream is ceased. At this juncture, no further liquid-fuel enters the reformer. Instead, fuel vapor is generated by the vaporizer.
3. The nozzle mixes the fuel-vapor with air, this mixture occurring within the confines of the nozzle The resulting fuel-vapor and air mixture is subjected to the reformer. (See description of the CBOX Process, infra)
4. During the above process (i.e. steps 1-3), catalysts within the reformer are heating up to activation temperature. Once the catalysts attain activation temperature, atomized water is mixed with the fuel-vapor and air mixture created in step 3. The resulting fuel-vapor/air/atomized water mixture is subjected to the reformer. (ATR Process)
5. Once the heat exchangers exceed water boiling temperature, steam, which is produced in the heat exchangers, is mixed with air, and then mixed with vaporized fuel generated by the vaporizer. This mixing of heated air/steam mixture with vaporized fuel occurs within the confines of the nozzle.

A more detailed description of the five-step process immediately follows: Initially, the mixing of liquid fuel, by the spraying of droplets, into the air stream takes place. When the vaporizer is ready, the nozzle mixes fuel vapor with air. At a later time, the nozzle mixes liquid water into the air-fuel stream by spraying liquid water droplets (diameters of fifty microns ($\mu$) or less) into the air. Finally, the nozzle then mixes the air and steam mixture with the vaporized fuel stream.

At and during the start-up period, the nozzle atomizes liquid fuel, and during normal operation, mixes fuel vapor with a steam/air mixture Further, the dual-function nozzle has the capability to homogeneously mix liquid fuel and air, and separately homogeneously mix fuel vapor and air A suitable proportion of the fuel vapor/air mixture is where the oxygen/carbon (O/C) ratio is greater than one and less than two. This O/C ratio avoids deposition of coke (C) on the catalyst and within the reactor system. As the catalyst beds warm up, liquid water can be injected into the reactor to enable operation at a higher oxygen atom to carbon atom ratio, if needed.

The fuel fluid is selected from the group consisting of gasoline, methane, methanol, ethanol, liquified propane gas (LPG), diesel, other hydrocarbon and alcohol fuels. Preferably, at the very onset of startup, the fuel entering the AIR is a liquid, inasmuch as the fuel vaporizer is heating up at this point. However, once some amount of warmup has taken place (70% of the end point temperature), the vaporizer is used, and the fuel can then be liquid, vapor, or mixed-phase.

When a vapor phase is utilized, the fuel is generally heated to a nominal temperature, e. g., for gasoline, the temperature is 200° C. If a fuel other than gasoline were is used in the vapor phase (e. g., a pure substance such as methanol, ethane, butane and other light hydrocarbons are possible.), the fuel is heated to just above the substance's boiling point. Selection of fuel also depends on the catalyst used.

If needed, the fuel and air mixture can be ignited with the help of a hot surface such as glow plugs, wires, and spark plugs.

The reaction of the fuel starts on the surface of the reformer catalyst to produce a mixture of hydrogen, carbon oxides, steam, and light hydrocarbons. This reaction also generates heat, which rapidly raises the temperature of the catalyst in the reforming zone, the reformer 18. A suitable catalyst (disclosed in U.S. Pat. No. 6,110,861, and incorporated herein by reference) is a metal-on-ceramic support. The mixture is wash-coated onto a substrate.

Figure 2:
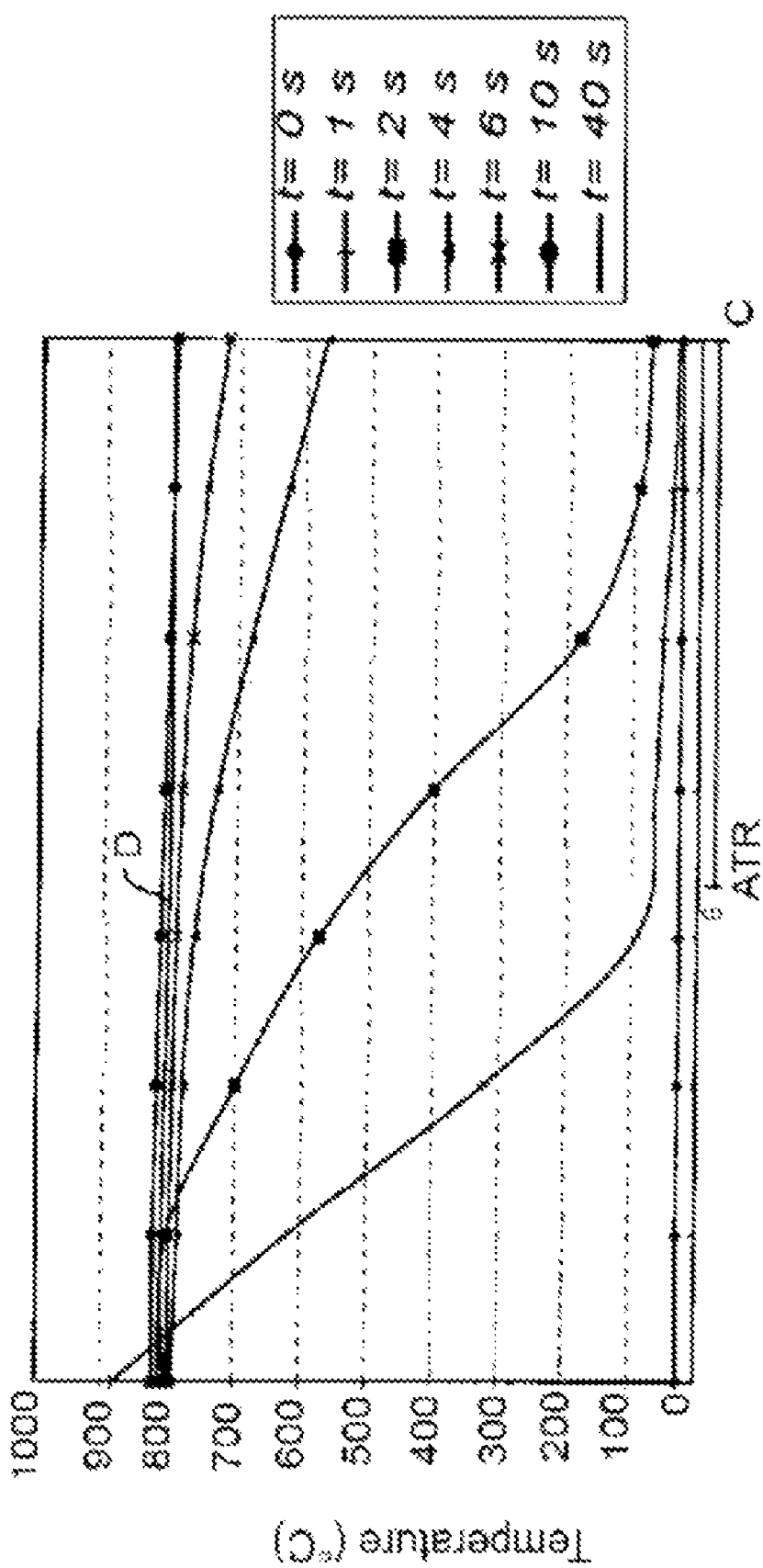
FIG. 2 is a plot of the modeled temperature profiles along the length of the ATR reactor during startup, in accordance with features of the present invention.

FIG. 2 displays a modeled temperature profile along the length of the reformer reactor during startup. At t=1 second (s), approximately the latter half of the reformer reactor, designated as line B-C is still at room temperature. At t=2 s, the temperature is clearly beginning to rise. At t=40 s, the entire reformer reactor is at >800° C.

The conversion of fuel with heat generation is achieved by adjusting the oxygen to carbon (O/C) ratio so the temperature in the ATR catalyst bed does not exceed 900° C.

At startup, fuel flow through the nozzle is initiated when the maximum temperature in the ATR catalyst exceeds approximately 200° C. When the temperature in the reformer exceeds 400° C., water injection can be initiated into the reformer area. The reformer then functions as an ATR.

The water injection is ramped at a rate to avoid quenching of the catalyst, This can be achieved with a water-to-carbon ratio of less than 1.0. The liquid water is injected in droplet sizes of less than 50 microns ($\mu$). This size of water particle ensures thorough mixing. Smaller water droplet sizes serve the purpose of thorough mixing even better.

The O/C and steam to carbon (S/C) ratios are adjusted such that the selected catalyst temperature does not exceed its sintering temperature. Generally, temperatures below 1000° C. are suitable, with temperatures not exceeding 900° C. preferable. Temperatures can be taken as high as catalyst sintering temperatures (e.g., approximately 1000° C. in the case of typical noble metal catalysts) but not for extended periods of time. The air-to-fuel and water-to-fuel ratios can be adjusted to decrease the temperature of local "hotspots," if any, to below 950° C.

In the alternative, the constraints of catalyst temperatures can cause reformate gas having egress from $P_3$ to contain combustible gas. In that event, the remaining combustible gas is subsequently and completely oxidized in an anode gas burner (not shown in FIG. 1 supra). The heat generated is used to preheat fuel processing air (into ATR or downstream injection points) or to generate fuel processing steam.

As the axial (direction of flow) temperature profile of the ATR rises, the O/C ratio is lowered and the SIC ratio is increased to reduce the exothermicity of the reforming reaction. The adjustment of the O/C and S/C ratios continues until the ATR temperatures have the desired profile as depicted in the t=40 s curve (designated as "D" in FIG. 2).

The hot reformate gas (water gas stream) 21 flows through the first heat exchanger, 26, transferring part of its heat to it. After exiting the first heat exchanger, but prior to entering the first water-gas shift zone, $WG_1$, the reformate gas 23 is mixed with an appropriate amount of air via an air supply line 22. This mixing causes the combustible gases to react with oxygen on an ignition catalyst, which is positioned upstream of the shift catalyst (i.e. the $WG_1$ shift catalyst). This reaction on the ignition catalyst generates additional heat and serves to increase the temperature of the shift zone $WG_1$ and heat exchanger $HE_2$.

The amount of air injected is carefully controlled to ensure rapid controlled heating (i. e., on the order of from 400° C. per minute to 800° C. per minute). The water-gas is thus subjected to catalyst at a temperature of 25° C. to 500° C. This sequence of air injection, oxidation to generate heat, and heat transfer to the reaction zones and heat exchangers is repeated several times as the reformate gas advances through the fuel processor and toward the fuel cell.

If air injection at any point results in a hot spot before the reaction zone has achieved the desired temperature profile, the air injection at that point is readjusted or temporarily stopped until the hot spot cools to a temperature, consistent with the temperatures of adjacent structures in that particular reaction zone.

A portion (from about 16 percent to 33 percent) of the total combustible or reformate gas 23 produced in the ATR assembly is oxidized or reacted at each oxidation or reaction point with the simultaneous injection of air at each point in the fuel processing train (FIG. 1 infra), i.e., just before the three WG inlets, and into the three preferential oxidation zones (P). (Sixteen percent is the approximate amount of reformate gas utilized at each point if all six points, WG and P. are used. One hundred percent divided by 6 gives approximately sixteen percent. Thirty-three percent is the figure if only the WG points are used. One hundred percent divided by three gives approximately thirty-three percent.)

Figure 3:
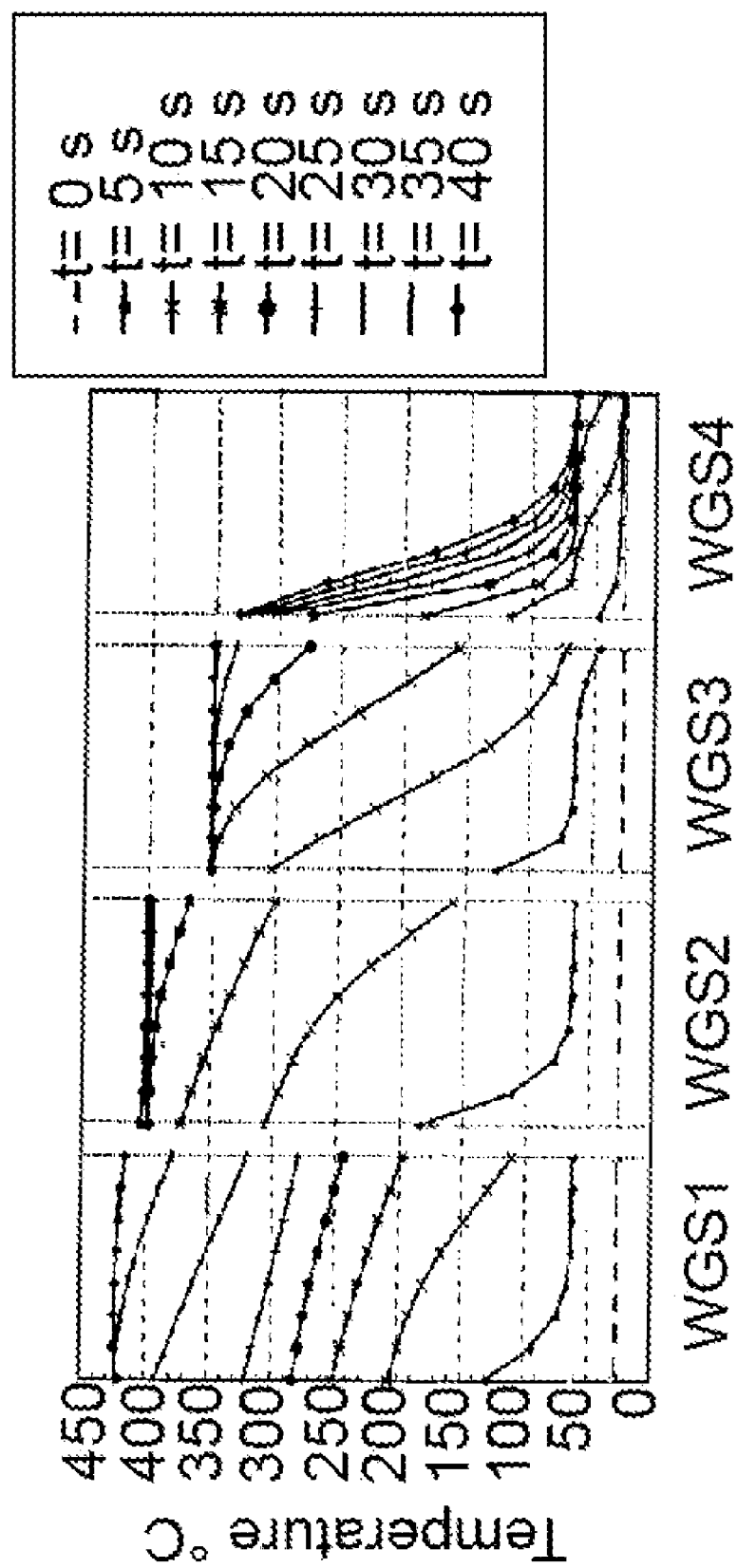
FIG. 3 is a schematic diagram of modeled temperature profiles along the lengths of the four water-gas shift reactor zones during startup, in accordance with features of the present invention.

FIG. 3 displays modeled temperature profiles along the lengths of the four water-gas shift reactor zones during startup. At t=1 s, approximately the latter half of each shift reactor zone is still at room temperature. At t=2 s, the temperature is clearly beginning to rise. At t=40 s, the entire water-gas shift reactor zone is at >300° C.

In order to reduce the thermal mass of the processor and thus diminish startup time and fuel costs, the heat exchangers 36 and 40 (i. e., $HE_1$ and $HE_4$-$HE_8$), preferably are not all brought to their design-point temperature(s) during startup. Otherwise, they would act as heat sinks and cool the reformate gas flowing through their hot passages. Rather, the cooled reformate gas is reheated when some hydrogen is burned just upstream of each reactor stage. This restriction of the heat up process to a low effective thermal mass (approximately 60% of total thermal mass) ensures delivery of polymer-electrolyte-fuel-cell (PEFC)-quality hydrogen gas quickly, and with low fuel consumption.

Figure 4:
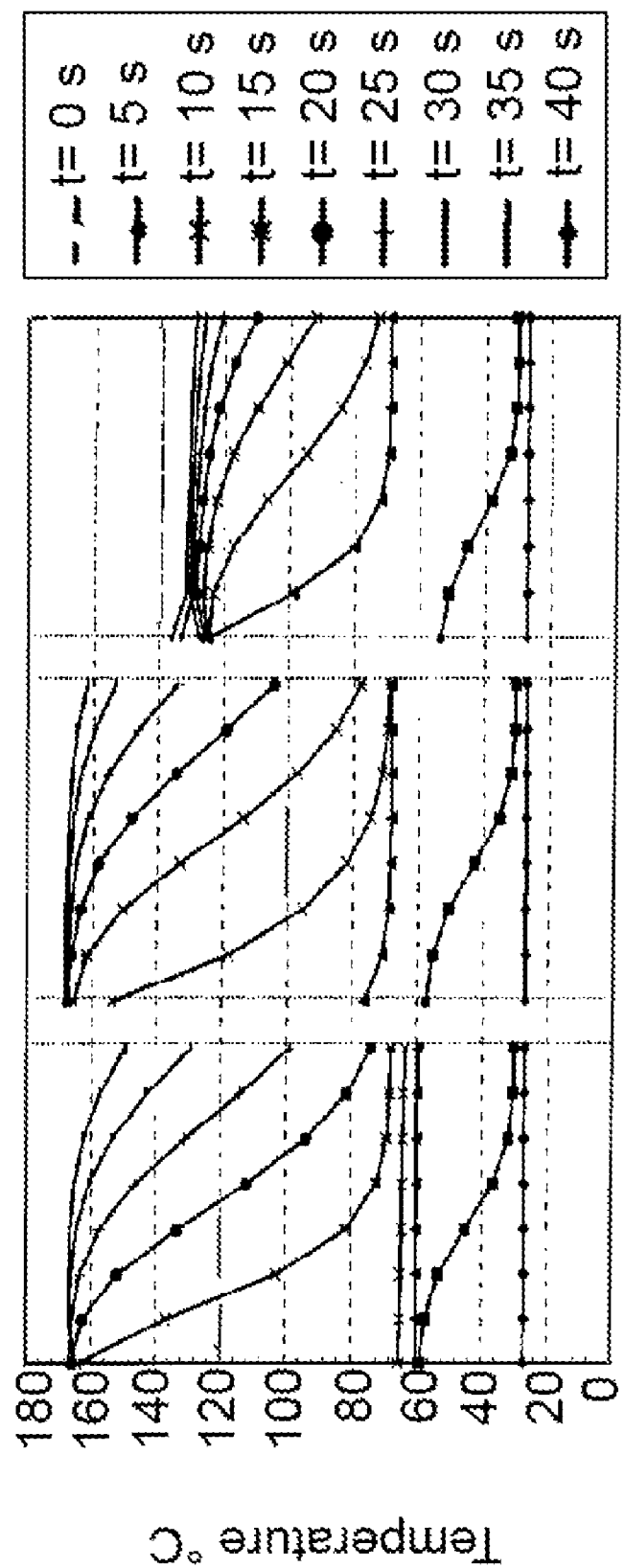
FIG. 4 is a plot of modeled temperature profiles along the lengths of the three preferential oxidation reaction zones during startup, in accordance with features of the present invention.

Further, it is not necessary to heat the bulkiest reactor stage, i. e., the fourth stage of the shift reactor, to its design temperature during startup. Inclusion of the preferential oxidation zones, ($P_1$, $P_2$, $P_3$), in the startup is optional. In the event of inclusion of the preferential oxidation zone in the startup process, FIG. 4 displays modeled temperature profiles along the lengths of the three preferential oxidation reactor zones during startup. At t=5 second (s), approximately the latter half of each preferential oxidation zone is still at room temperature. At t=10 s, the temperature is clearly beginning to rise. At t=40 s, the entire preferential oxidation zone is at >100° C.

Vaporizer Detail

Details of an exemplary fuel vaporizer 16 are depicted in FIG. 5. The vaporizer 16 comprises a housing 42 containing a first heating element 43 which supplies the latent heat of vaporization for the fuel, and a second heating element 44 which provides any small amount of superheating. These elements are shaped so as to define a fuel flow passage 47 through which the fuel can travel while traversing the vaporizer. The vaporizer further comprises a plurality of thermocouples 46 (TCs 6031, 6032, and 6033) to monitor fuel temperature as the fuel is being vaporized by the two heating elements 43 and 44. The fuel has a point of ingress 41 and a point of egress 48. A thermocouple (TC 6030) 49 measures the fuel vapor temperature at the point of egress 48. The arrows in FIG. 5 represent the direction of fuel movement.

Reformer Detail

Figure 6:
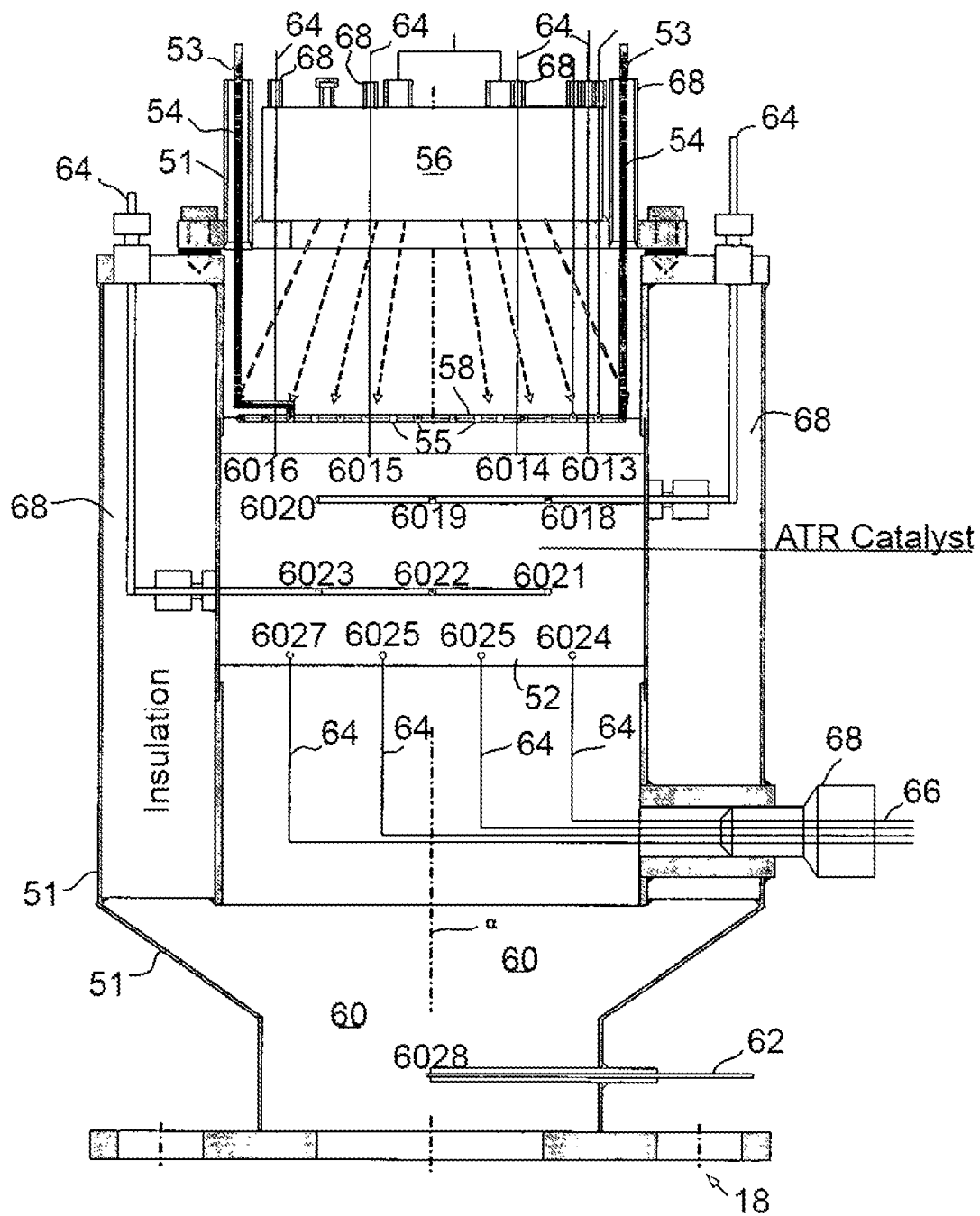
FIG. 6 depicts an autothermal or self-heating fuel reformer (ATR), in accordance with features of the present invention.

Details of an exemplary reformer 18 are depicted in FIG. 6. The reformer 18 comprises a housing 51 containing a catalyst 52, a means for heating 53 fuel, mixing nozzles 56, and insulation 68.

The heating means 53 comprises a plurality of heating leads or rods 54 to supply a plurality of heating coils 55. The leads are rated for 400 watts (W) at 100 volts (V), and a plurality of coils 55.

Reactant fuel enters the reformer 18 through a point of ingress, a nozzle 56. The fuel is atomized or otherwise dispersed via a mixing nozzle 56, which is located upstream from a fuel heating surface 58. The surface 58 is comprised of the coils 55 in electrical communication with the electrical leads 54. (The arrows in the upper region represent feed fuel.) The Coils 58 are arranged to maximize heat transfer to fluid passing between the coils. As such, in a preferred embodiment, an exemplary coil configuration defines a plane positioned perpendicularly to the direction of flow of the various fuel mixtures discussed supra.

The surface 58 is adapted to allow the atomized fuel to pass through fuel passage ways defined by separations between the coils 59 so as to be heated by the coils 59 during passthrough. The surface 58 is positioned intermediate the nozzle 56 and the catalyst 52. Inferior (i.e., downstream) to the catalyst bed 52 is an empty volume 60 into which outgas has ingress. TC 6028 62 measures the outgas temperature. All thermocouple leads 64 are connected to a computer 66 and are encapsulated with insulation 68 which is contained within the housing 51.

Figure 7A:
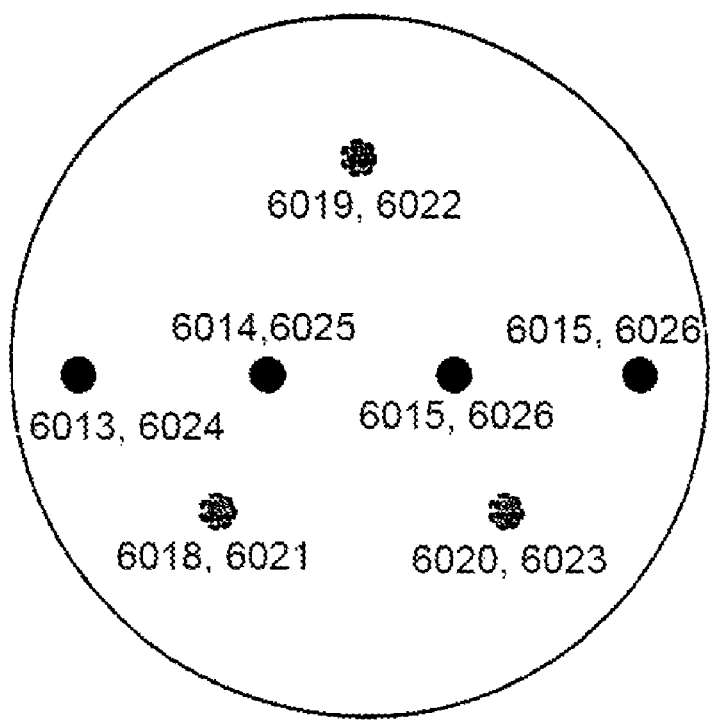
FIGS. 7A-B depict the relative thermocouple positions in the ATR catalyst layers, in accordance with features of the present invention.
Figure 7B:
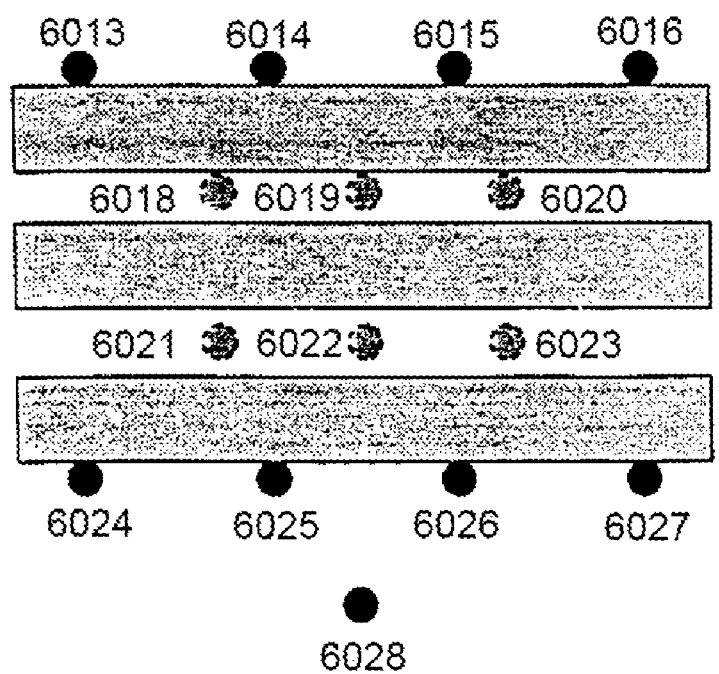

The reformer assembly has a plurality of thermocouples (TC) as depicted in FIGS. 7A and 7B, said thermocouples placed to provide sufficient temperature data to allow the fuel processor to attain optimum operating conditions through a computerized feedback loop. FIG. 7A is a view from the top of the ATR, along line a of FIG. 6 TCs 6019 and 6022 being in a vertical straight line with each other, similarly for TCs 6013 and 6024, etc. FIG. 7B depicts the ATR assembly within which each layer comprises catalyst. In FIG. 7B, relative to the nozzle assembly 56, top layer of the thermocouples (6013, 6014, 6015, and 6016) are positioned in closer spatial relationship and nearer to the fuel ingress point 28 than the bottom layer of thermocouples (6024, 6025, 6026, 6027). As such, the later group of thermocouples are positioned near the exit area of the assembly.

EXAMPLE

The start-up procedure begins by establishing a fuel flow rate (gasoline) of 40 grams per minute (g/min) to the fuel vaporizer. A three-way valve connecting the vaporizer to the ATR was initially left in a recycle position so that the vaporized fuel does not enter the ATR, but is recycled within the vaporizer. The vaporizer power is set at a level of 100% (maximum level) on a Variac (240V, 600 W) When the fuel vaporizer exit temperature reached 150° C., the Variac power level was reduced (e.g., to 80%) so as to stabilize the vaporized fuel's temperature to just above the fuel end point (which in the case of gasoline is 210° C.).

The air flow to the reformer is begun at 5 Liters per minute (L/min), and the igniter power is turned on at a level of 400 W. When the igniter coil reached 600° C., and the catalyst temperature (TCs 6013-6016) exceeded 200° C., the air flow to the ATR was increased to 104 L/min. The flow of vaporized fuel at a rate of 40 g/min was attained by switching the three-way valve from the re-circulating position to the feed position to the ATR. After fuel ignition was obtained, water was added as needed. FIGS. 8A-C depict the feed rates of fuel (g/min), water (milliliters per minute (mL/min)), and air (standard liters per minute (SLPM)) as a function of time in one trial of the ATR. Zero time in FIGS. 8A-C was when the run was initiated and the vaporizer power set at 100%. The introduction of fuel and air was delayed for one minute so as to allow the front-edge of the catalyst to reach the temperature of 200° C.

FIGS. 9A-D display the temperature histories as a function of time for TCs 6013-6016. FIGS. 10A-E display the temperature histories as a function of time for the TCs 6018-6019 and 6021-3023. The temperature differences for TCs 6018-4019 and 6021-6023 are similar to those for the TCs 6013-6016.

FIGS. 11A-E depict the temperature history of TCs 6024-6028 as a function of time at the exit face of the ATR during start-up. The exit face temperatures reached 400° C. in about 2.5 min.

Figure 8:
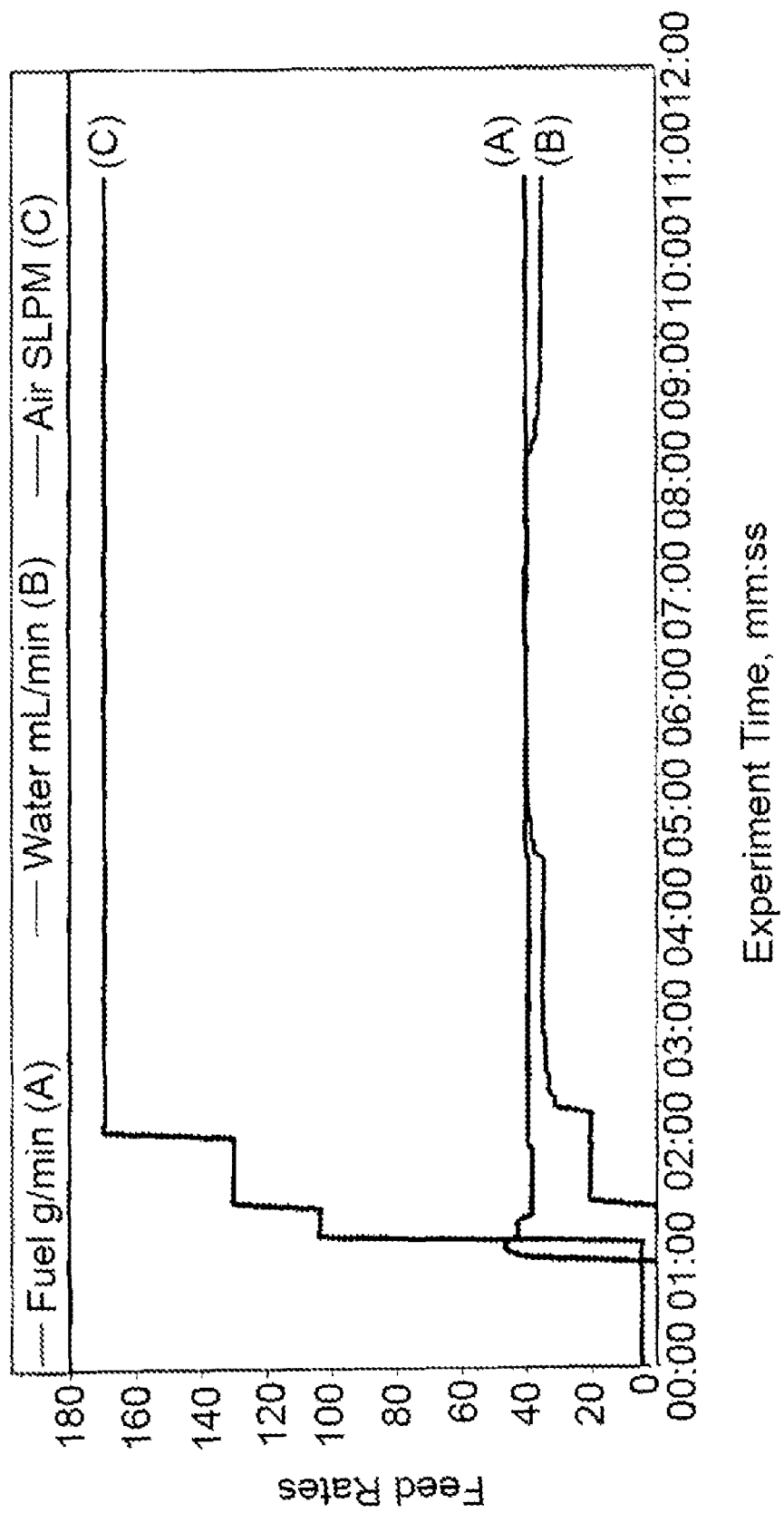
FIG. 8 depicts the feed rates of fuel, water, and air as a function of time in one trial of an ATR, in accordance with features of the present invention.
Figure 9:
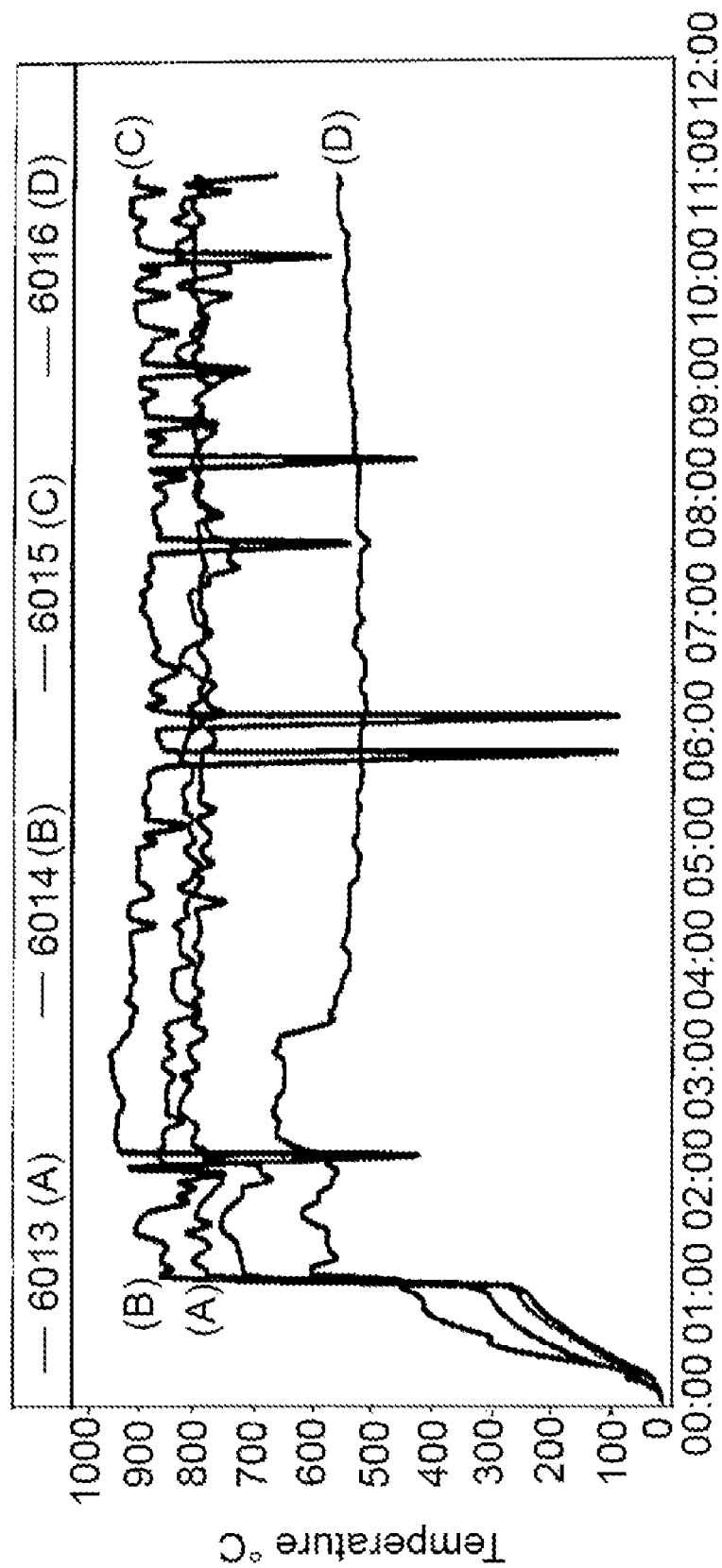
FIG. 9 depicts the temperature histories as a function of time of the first four thermocouples at the inlet face of the ATR during start-up, in accordance with features of the present invention.
Figure 10:
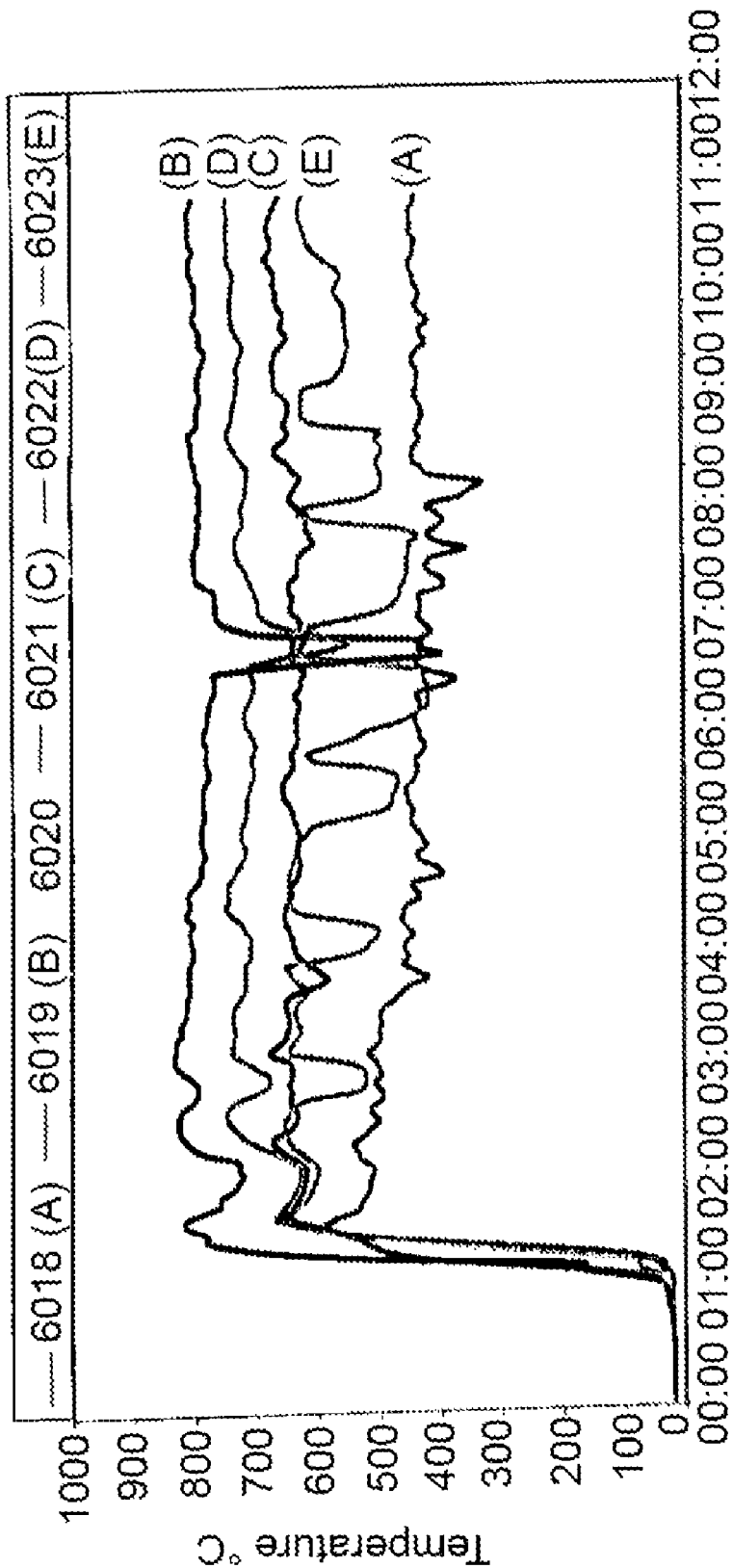
FIG. 10 depicts the temperature histories as a function of time of thermocouples within the ATR catalyst layers during start-up of the ATR, in accordance with features of the present invention.
Figure 11:
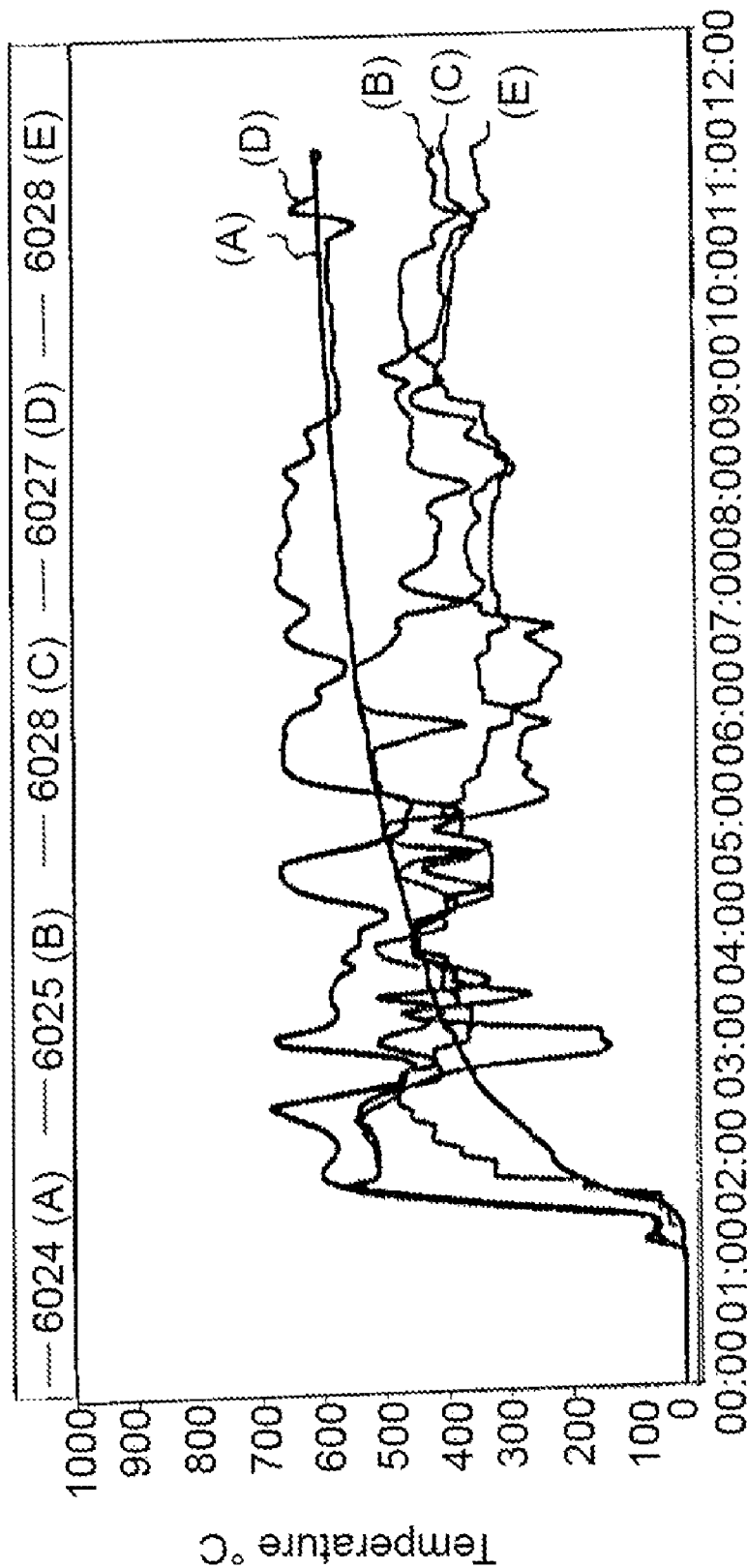
FIG. 11 depicts the temperature history as a function of time at the exit face of the ATR during start-up, in accordance with features of the present invention.

The sharp temperature drops displayed in FIGS. 8, 9 and 11 can be due to temporary quenching of the TCs and their environs with water droplets.

Figure 12:
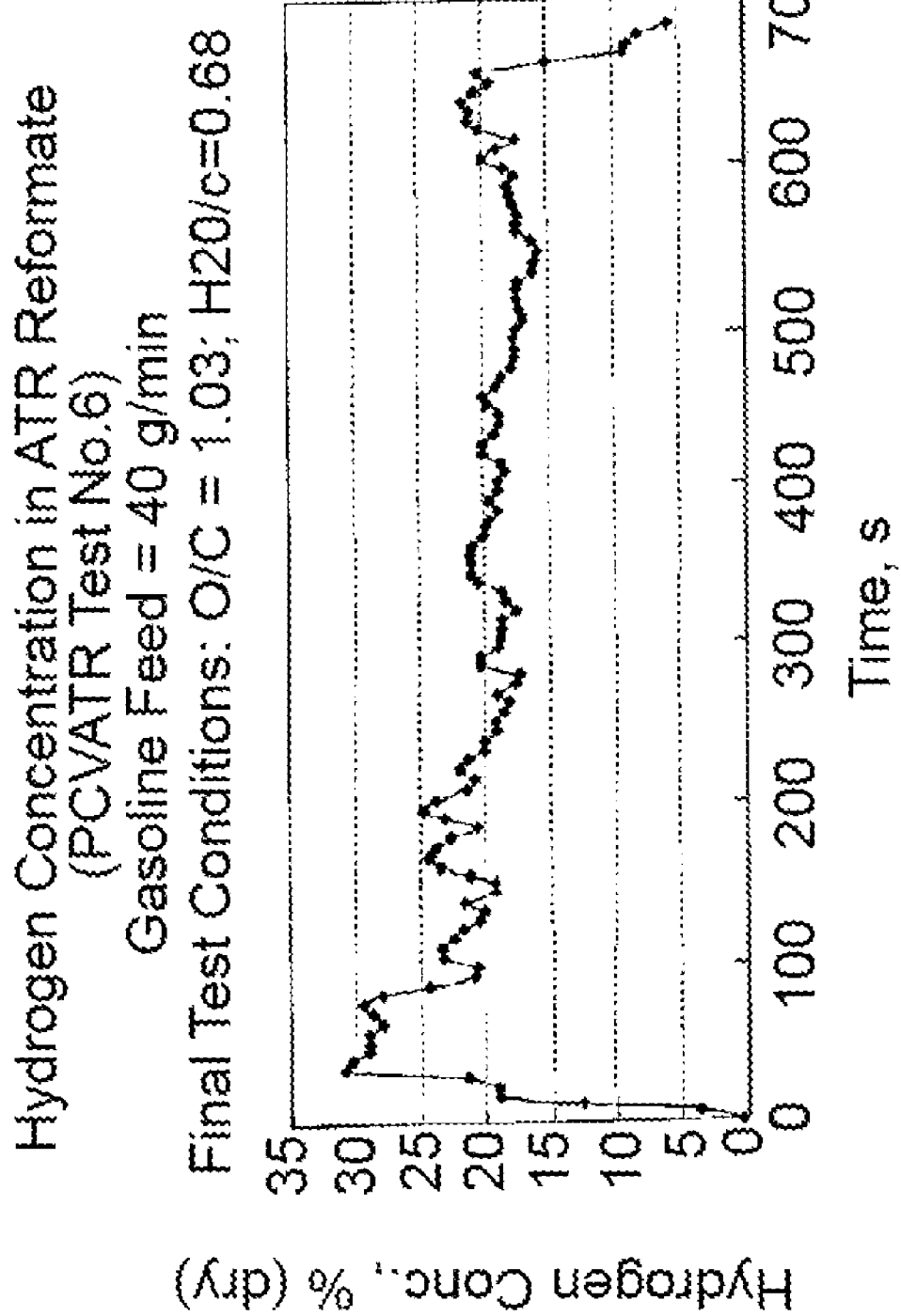
FIG. 12 depicts the hydrogen concentration in the reformate gas as a function of time from the ATR during start-up, in accordance with features of the present invention.

FIG. 12 depicts the hydrogen concentration (volume (vol) percent or mole (mol) percent), dry gas) in the reformate gas as a function of time from the ATR during start-up. The trial's final conditions were fuel (gasoline) fed at a rate of 40 g/min into the vaporizer, an oxygen to carbon atom ratio of 1.03 (for air-fuel mixture), and a water molecule to carbon atom ratio (water to fuel) of 0.68. The hydrogen concentration reached 30 vol. percent, but dropped to approximately 20 vol. percent after the initiation of water spraying.

The aforementioned nozzle homogeneously mixes and deliverers a spray of the liquid fuel and cold air at startup. The nozzle further homogeneously mixes vaporized fuel, heated air, and superheated steam during equilibrium operation temperatures, the mixing occurring within the confines of the nozzle.

A nominal figure for the amount of liquid fuel required for a start-up period of thirty seconds is 60 cubic centimeters ($cm^3$) or milliliters (mL) of gasoline. This amount of fuel produces 165 $cm^3$ of $H_2$ per minute at a temperature of 80° C., and, in addition, that same amount of fuel, 60 $cm^3$ of gasoline per minute, produces 10 kW of electricity. The exact amount of liquid fuel needed for a start-up period of 30 seconds will depend on the actual size of the fuel processor unit.

Once warmup or start-up has been achieved, the oxygen/carbon ratio (O/C) declines to the normal reforming mode ratio of 0.7 to 0.75. After the catalysts arrive at their design operating temperatures, far less oxygen is needed as the catalysts do the reforming to produce fuel-cell quality hydrogen.

During normal operation, the ATR reactor operates at conditions at which the fuel is converted into a mixture of hydrogen, carbon oxides, and light hydrocarbons, and sufficient heat is generated to maintain the temperature of the ATR catalyst.

A combination of process variables must be carefully controlled to obtain optimized thermal conditions. Key process variables include the time-dependent feed rates, proportions, and air injections.

While the invention has been described with reference to details of the illustrated embodiments, these details are not intended to limit the scope of the invention as defined in the appended claims.

The invention claimed is:

1. A fuel processor comprising:
   a. a housing containing a nozzle, whereby the nozzle is adapted to mix fuel and air within the confines of the nozzle;
   b. a heating surface adapted to heat and oxidize the mixed fuel;
   c. a reforming catalyst, whereby the fuel heating surface is positioned intermediate said nozzle and catalyst, and comprises passageways for the heat and heated fuel to pass through to contact the catalyst;
   d. water-gas reaction zones positioned downstream from said reforming catalyst;
   e. a heat exchanger positioned up stream of each water gas reaction zone; and
   f. mixing zones present between said water-gas reaction zones and said heat exchangers wherein the mixing zones provide a means to mix air with reformate gas generated in said water-gas reaction zones.

2. A fuel processor as recited in claim 1 wherein the fuel heating surface is comprised of coils arranged in a configuration defining a plane positioned perpendicularly to the direction of flow of fuel through the housing.

3. The fuel processor as recited in claim 1 wherein the nozzle is adapted to homogeneously mix liquid fuel and cold air.

4. The fuel processor as recited in claim 1 wherein the nozzle is adapted to homogeneously mix vaporized fuel, heated air, and superheated steam.

* * * * *